(12) United States Patent
Erisoty et al.

(10) Patent No.: US 6,606,795 B2
(45) Date of Patent: Aug. 19, 2003

(54) TWO-POSITION QUICK-CHANGE SAW

(76) Inventors: Gregory J. Erisoty, 6 Riverton Rd., Riverton, CT (US) 06065; Raymond J. MacQueen, Jr., 52 Lynette Ct., New Hartford, CT (US) 06057

( * ) Notice: Subject to any disclaimer, the term of this patent is extended or adjusted under 35 U.S.C. 154(b) by 139 days.

(21) Appl. No.: 09/839,195

(22) Filed: Apr. 19, 2001

(65) Prior Publication Data

US 2002/0178592 A1 Dec. 5, 2002

(51) Int. Cl.$^7$ ................................................ B23D 51/03

(52) U.S. Cl. ........................................ 30/512; 30/513

(58) Field of Search ........................ 30/513, 506, 507, 30/501, 510, 511, 512, 122, 329

(56) References Cited

U.S. PATENT DOCUMENTS

| | | | | |
|---|---|---|---|---|
| 25,015 A | * | 8/1859 | Haynes | 30/506 |
| 766,077 A | | 7/1904 | Tilden | |
| 1,028,230 A | | 6/1912 | Leonard | |
| 1,080,365 A | | 12/1913 | O'Neill et al. | |
| 1,175,582 A | * | 3/1916 | Bangert | 30/506 |
| 1,187,460 A | | 6/1916 | Jull | |
| 1,206,638 A | | 11/1916 | Wren | |
| 1,245,345 A | | 11/1917 | Howell | |
| 1,394,174 A | | 10/1921 | Ireland et al. | |
| 1,429,195 A | * | 9/1922 | Donaldson | 30/512 |
| 1,471,214 A | * | 10/1923 | Sieben | 30/510 |
| 1,517,827 A | | 5/1924 | De Grado | |
| 1,522,598 A | | 1/1925 | Smith | |
| 1,565,861 A | | 12/1925 | McIntyre | |
| 1,695,231 A | | 12/1928 | Egan | |
| 2,173,365 A | | 9/1939 | Kessler | |
| 2,309,816 A | | 2/1943 | Allen | |
| 2,514,880 A | | 7/1950 | Leathermann | |
| 2,556,093 A | * | 6/1951 | Leatherman | 30/511 |
| 2,559,686 A | * | 7/1951 | Suhre | 30/510 |
| 2,580,896 A | | 1/1952 | Dohner | |
| 2,612,920 A | * | 10/1952 | Williams | 30/511 |
| 2,645,261 A | * | 7/1953 | Swanstrom | 30/506 |
| 2,662,567 A | | 12/1953 | La Roche | |
| 2,771,925 A | * | 11/1956 | Littman | 30/507 |
| 2,782,821 A | | 2/1957 | Gunnerson | |
| 2,788,036 A | * | 4/1957 | Kromsten | 30/511 |
| 3,636,997 A | | 1/1972 | Keymer | |
| 3,822,731 A | | 7/1974 | Keymer | |
| 4,349,059 A | | 9/1982 | Hepworth et al. | |
| 4,580,344 A | * | 4/1986 | Jinghage et al. | 30/507 |
| 4,680,863 A | | 7/1987 | Duffy | |
| 4,835,869 A | | 6/1989 | Waldherr | |
| D318,006 S | | 7/1991 | Wanner et al. | |
| 5,471,752 A | | 12/1995 | Koetsch | |

(List continued on next page.)

OTHER PUBLICATIONS

Three Photocopies of Stanley Hacksaw Product Cards.

*Primary Examiner*—Allan N. Shoap
*Assistant Examiner*—Jason Prone
(74) *Attorney, Agent, or Firm*—Ira S. Dorman

(57) ABSTRACT

A two-position, quick-change hacksaw consists of a back member, handle structure adjacent a rearward end portion of the back member, and a swing arm adjacent the forward end. The free end of the swing arm and the forward end portion of the back member have coplanar blade-engaging elements thereon which serve to engage the forward end of the blade and which are commonly disposed on an arc that circumscribes a third coplanar blade-engaging element disposed on a coupling block of a tensioning mechanism for mounting the rearward end of the blade. Two coplanar sets of transversely paired engagement elements enable mounting of the blade both in a plane parallel to a medial plane of the frame and also in a plane disposed at a substantial angle thereto. In one configuration, with the swing arm in its inoperative position, the saw is adapted for cutting within a relatively confined space; with the swing arm in its operative position the saw is configured for cutting within a relatively unconfined space.

11 Claims, 3 Drawing Sheets

U.S. PATENT DOCUMENTS

| | | |
|---|---|---|
| 5,873,170 A | 2/1999 | Stanley |
| 6,070,330 A | 6/2000 | Phelon et al. |
| 6,079,109 A | 6/2000 | Ranieri |
| D428,321 S | 7/2000 | Ranieri et al. |
| 6,158,131 A * | 12/2000 | Costanzo et al. .............. 30/506 |
| 6,230,412 B1 * | 5/2001 | Lin .............................. 30/507 |
| 6,298,564 B1 * | 10/2001 | Voser et al. ................... 30/512 |

* cited by examiner

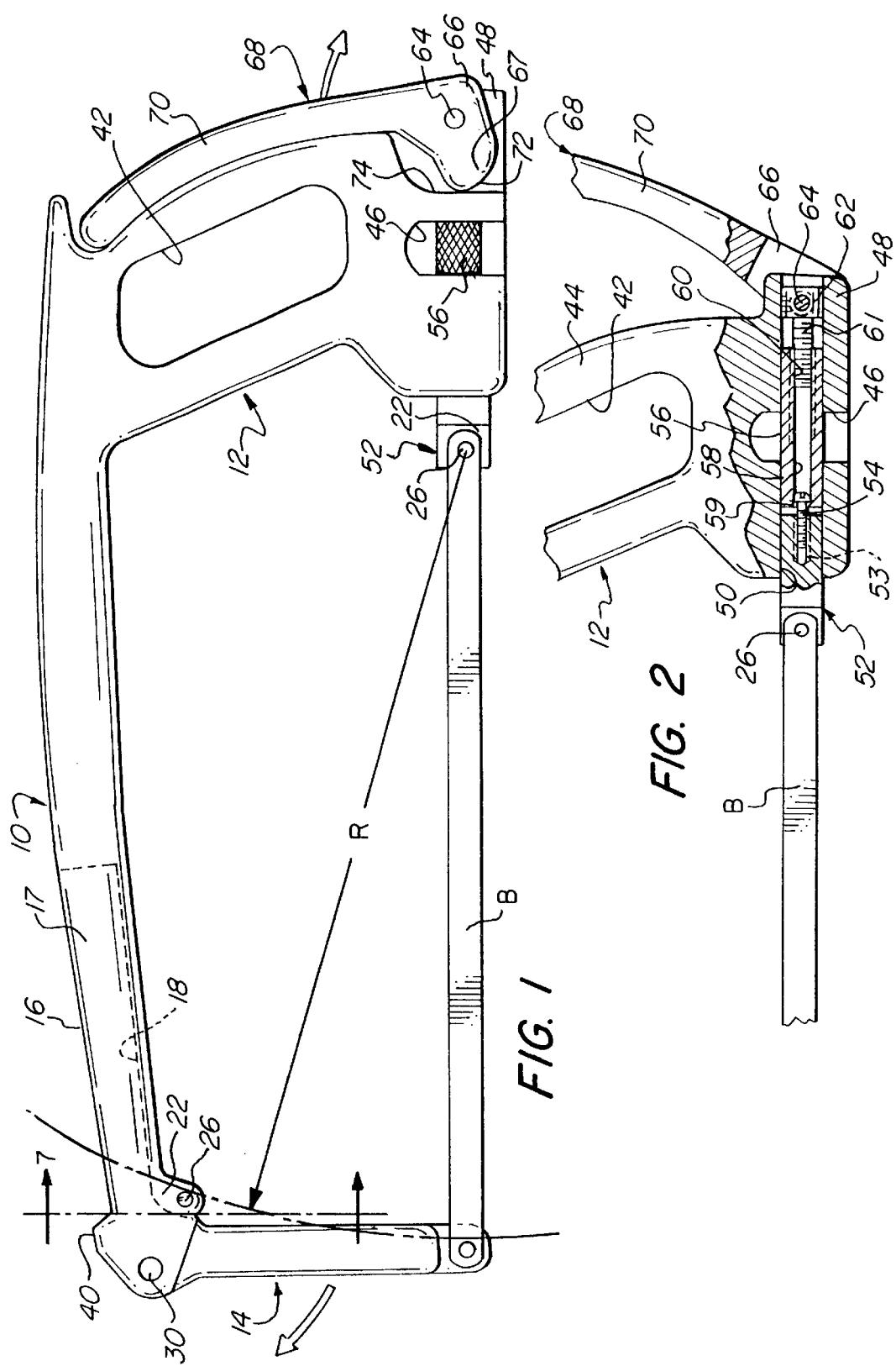

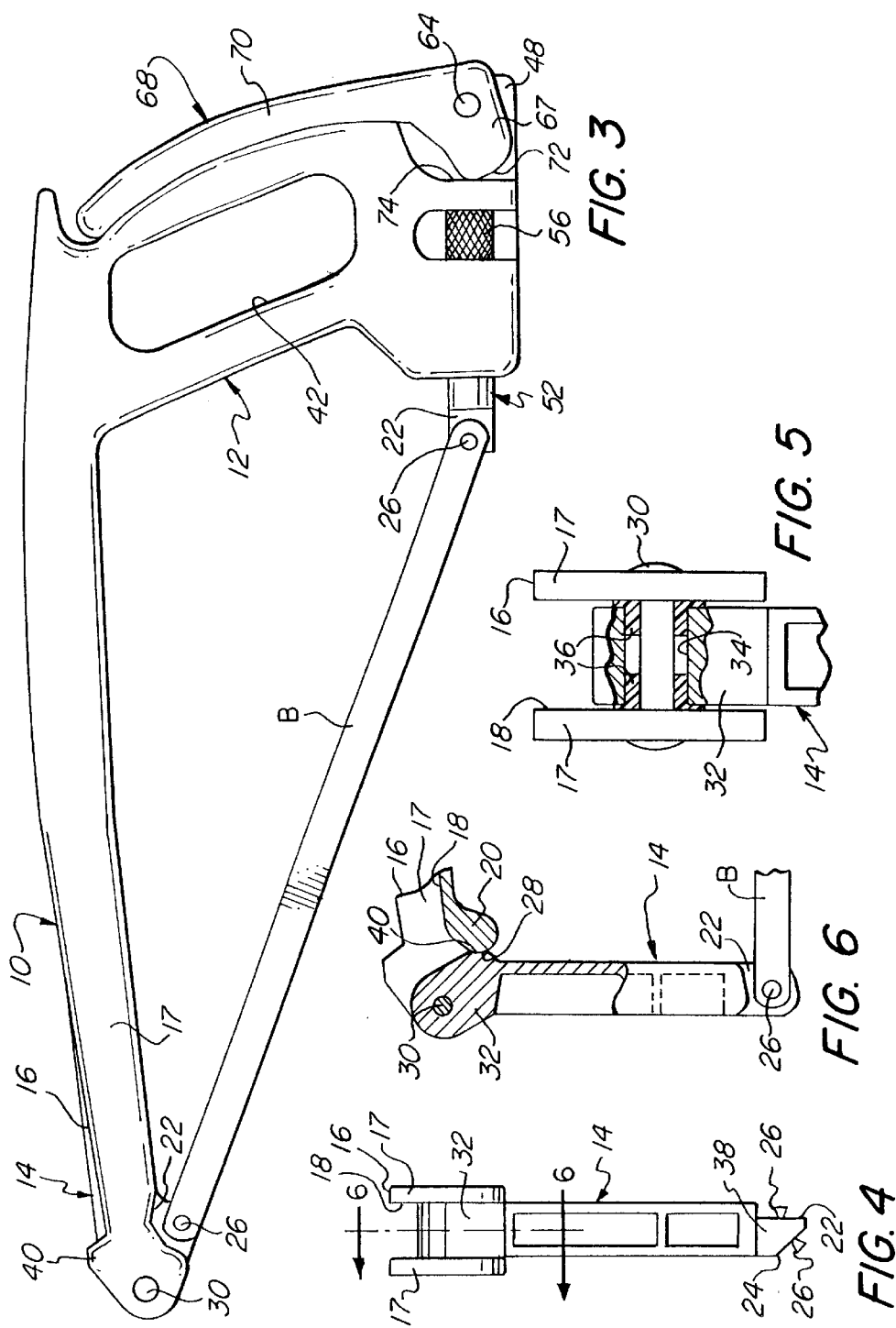

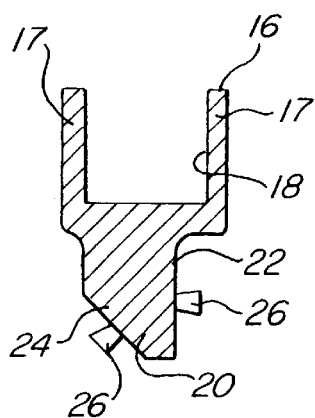
FIG. 7
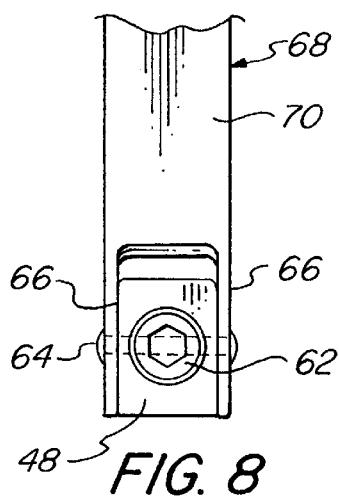
FIG. 8
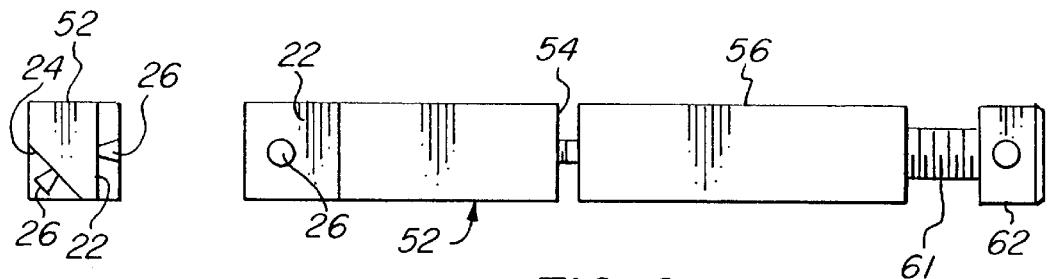
FIG. 10
FIG. 9

TWO-POSITION QUICK-CHANGE SAW

BACKGROUND OF THE INVENTION

Reconfigurable saws of various kinds are well-known in the art, as evidenced by the following United States patents:

| | |
|---|---|
| U.S. Pat. No. 1,028,230 | U.S. Pat. No. 2,782,821 |
| U.S. Pat. No. 1,245,345 | U.S. Pat. No. 4,680,863 |
| U.S. Pat. No. 2,173,365 | U.S. Pat. No. 5,873,170 |
| U.S. Pat. No. 2,514,880 | |

The incorporation of a pivotable arm into a hacksaw frame is disclosed in U.S. Pat. Nos. 2,309,816 and 5,471,752, and the following U.S. patents provide a variety of blade-tensioning arrangements:

| | |
|---|---|
| Des. 428,321 | U.S. Pat. No. 1,565,861 |
| U.S. Pat. No. 766,077 | U.S. Pat. No. 3,636,997 |
| U.S. Pat. No. 1,080,365 | U.S. Pat. No. 4,349,059 |
| U.S. Pat. No. 1,187,460 | U.S. Pat. No. 6,070,330 |
| U.S. Pat. No. 1,517,827 | U.S. Pat. No. 6,079,109 |

Additional forms of saws are disclosed in the following U.S. patents:

| | |
|---|---|
| Des. 318,006 | U.S. Pat. No. 2,580,896 |
| U.S. Pat. No. 1,206,638 | U.S. Pat. No. 2,662,567 |
| U.S. Pat. No. 1,394,174 | U.S. Pat. No. 3,822,731 |
| U.S. Pat. No. 1,522,598 | U.S. Pat. No. 4,835,869 |
| U.S. Pat. No. 1,695,231 | |

Among the foregoing, particular note may be made of Duffy U.S. Pat. No. 4,680,863. Duffy describes a saw in which the blade can be disposed either parallel to the back member or in a number of angular relationships thereto, such variation being achieved, in part, by rotating one of three fingers into operative position.

The saw provided by Duffy would however appear to suffer from several significant drawbacks. First of all, because a plurality of laterally stacked fingers are employed the limited space available requires each finger to be relatively thin and, therefore, to be relatively weak. The thinness of the fingers also precludes the provision of blade-mounting elements on opposite sides thereof, such as to enable orientation of the blade both parallel to a medial plane of the frame and also at an angle thereto, as is conventional (typically at an angle of 45°) and desirable. Moreover, because the fingers are spaced in different lateral planes the mounted blade must (at least when either of two of the three fingers are used) extend at an angle to the medial plane; albeit relatively small, such angular displacement would preclude accuracy of cutting (unless the saw itself were held at an artificial angle to the workpiece). Finally, because forward blade-engagement elements are provided only on the fingers of the Duffy saw, the blade must be displaced from the back member in all configurations, and minimal spacing capability cannot therefore be achieved.

SUMMARY OF THE INVENTION

Accordingly, it is a broad object of the present invention to provide a saw frame assembly that enables ready tensioning and release of the mounted blade, coupled with facile conversion between either of two configurations, one of which configurations is diminished from the other to enable cutting within relatively confined spaces.

Other objects of the invention are to provide such a frame assembly which enables orientation of the mounted saw blade both parallel to a medial plane and also at an angle thereto, which assembly is of strong, durable construction, is practical and economical to manufacture, and is comfortable and convenient to use and to operate for quick and easy conversion.

It has now been found that certain of the foregoing and related objects of the invention are attained by the provision of a saw frame assembly which includes a generally planar frame comprising a back member, handle structure, and a single, elongate arm member. The arm member is substantially nonremovably mounted on the forward end portion of the back member for movement between a first position, in which it extends downwardly from the back member in generally confronting, coplanar, spaced relationship to the handle structure, and a second position in which it extends generally along the back member. A first pair of substantially transversely aligned blade-engaging elements are provided on opposite sides of a distal end portion of the arm member, and a second pair of such elements are provided on the opposite sides of a forward end portion of the back member. A quick-release blade-tensioning mechanism is mounted on the frame, and is constructed to effect displacement of a movable member between blade-tensioning and blade-releasing positions, the movable member having a third pair of such blade-engaging elements on opposite sides thereof. Each of the blade-engaging elements is constructed to engage one end of a removably mounted saw blade, and the first and second pairs thereof are commonly disposed on an arc circumscribing the third pair, at least in the blade-tensioning position of the movable member. One element of each pair of blade-engaging elements lies substantially in a first lateral plane, disposed to one side of the medial plane of the frame, and is constructed to orient a mounted blade substantially parallel to the plane, and the other element of each pair lies in a second lateral plane, disposed to the opposite side of the medial plane, and is constructed to orient the mounted blade at a substantial angle to the plane. In one configuration of the frame assembly a saw blade is mounted (in either of the two orientations enabled) between the second and third pairs of blade-engaging elements, for cutting within a relatively confined space, and it is readily converted for mounting the blade between the first and third blade-engaging elements, for cutting within a relatively open, unconfined space.

The arm member will usually be substantially rectilinear and pivotably mounted on the back member of the frame, with abutment elements cooperatively defining a limit of its lowered, operative position. The forward end portion of the back member will advantageously define an upwardly opening channel in which the arm member is disposed in its inoperative position. Each of the blade-engaging elements will typically comprise a permanent pin or stud that projects normal to an orienting, blade-supporting surface of the mounting structure.

In especially preferred embodiments of the assembly the handle structure of the frame will provide a cam bearing surface, and the blade-tensioning mechanism will comprise a lever-form of operating member and a turnbuckle arrangement. A cam element on the operating member will engage the cam bearing surface and cooperate therewith to effect displacement of a movable member on which the third pair of engagement elements is provided, and the turnbuckle arrangement will most advantageously include a tension-adjusting link element that is readily accessible for manual adjustment. The movable member may be a coupling block that is slidably received in a forward section of a channel formed in the handle structure; the turnbuckle arrangement may also be received in the channel and accessible for adjustment through an opening extending transversely through the handle structure.

In other preferred embodiments of the frame assembly the handle structure will comprise a gripping component, having a rearward surface portion, and the blade-tensioning mechanism will include a pivotably mounted operating lever. An arm portion of the operating lever will extend upwardly against the rearward surface portion of the gripping component, in the blade-tensioning position, and will be configured to cooperate therewith to provide a comfortable hand grip for the saw assembly.

BRIEF DESCRIPTION OF THE DRAWINGS

FIG. 1 is a side elevational view of a hacksaw embodying the present invention;

FIG. 2 is a fragmentary view of the handle structure of the hacksaw of FIG. 1, shown in partial section and with the cam lock handle in its blade-releasing, open position;

FIG. 3 is a side elevational view showing the hacksaw in its alternative configuration;

FIG. 4 is a front view of the forward portion of the hacksaw, in the configuration depicted in FIG. 1;

FIG. 5 is a fragmentary view of the portion shown in FIG. 4, drawn to an enlarged scale and with a section of the hub of the swing arm broken away to show internal features;

FIG. 6 is a fragmentary side elevational view of the forward portion of the hacksaw, shown in partial section as viewed along line 6—6 of FIG. 4;

FIG. 7 is a sectional view of a forward portion of the hacksaw, taken along line 7—7 of FIG. 1;

FIG. 8 is a fragmentary end elevational view a rearward portion of the hacksaw, in the open condition depicted in FIG. 2;

FIG. 9 is a side elevational view of the coupling block assembly comprising the tensioning mechanism employed in the saw; and FIG. 10 is a front elevational view of the coupling block.

DETAILED DESCRIPTION OF THE PREFERRED AND ILLUSTRATED EMBODIMENT

Turning now in detail to the appended drawings, therein illustrated is a hacksaw embodying the present invention and consisting of a frame comprised of a back member, generally designated by the numeral 10, handle structure generally designated by the numeral 12, and a swing arm generally designated by the numeral 14. The forward portion 16 of the back member 10 is formed with an upwardly opening channel 18, and has a downwardly projecting mounting lobe 20 with a "90°" lateral surface 22 on one side and a "45°" lateral surface 24 on its opposite side; the lobe 20 provides a forwardly directed, curved bearing surface 28, and a mounting pin 26 projects normal to each of the surfaces 22, 24.

A radial rivet 30 spans the lateral walls 17 defining the forward portion 16 of the back member 10 and extends through the passage 34 in the hub portion 32 of the swing arm 14, thus serving as an axle for rotatably mounting the swing arm 14. A pair of flanged bushings 36 (made for example from TEFLON) are interposed between the mating surfaces of the walls 17, the hub portion 32, and the rivet 30, to enable facile pivoting of the arm 14 while affording a high degree of mechanical stability.

The free end of the swing arm 14 is provided with a mounting piece 38, formed with 90° and 45° surfaces, 22 and 24 respectively, and with pins 26 projecting normal thereto, thus providing mounting features essentially identical to the features provided by the lobe 20 on the forward portion 16 of the back member 10. A curved bearing surface 40 on the hub portion 32 of the arm 14 cooperates with the bearing surface 28 on the lobe 20 to define the fully downwardly rotated, operative position of the arm.

The handle structure 12 is formed with a large opening 42, which defines a gripping portion 44. Passage 46 extends transversely through the bottom portion of the handle structure 12, and lateral indentations formed adjacent thereto, on both sides of the frame, define a mounting tail part 48 which is bounded along its forward margins by bearing surfaces 74 (the surface 74 on only one side being visible in FIGS. 1 and 3).

A channel 50 of square cross section extends longitudinally, from front to rear, through the bottom portion of the handle structure 12 and is intersected by the transverse passage 46. As part of the tensioning mechanism, a coupling block, generally designated by the numeral 52, is slidably received in the forward portion of the channel 50, and has an end portion formed with 90° and 45° surfaces, 22 and 24 respectively, normal to which project engagement pins 26; here again, therefore, the coupling block 52 provides mounting features identical to those that are provided by the lobe 20 and the mounting piece 38. A blind bore 53 extends axially into the coupling block 52 from its opposite end, and receives the threaded end of a pivot post 54, which is permanently bonded in place.

Also received within the channel 50 is a knurled cylinder 56, which has a bore 58 defined at its forward end by an annular wall 59, through which passes the shank of the pivot post 54; the head portion of the post engages the wall 59 and serves to affix the cylinder 56 to the coupling block 52 for free rotation of the cylinder 56 about its axis. The threaded end of a screw 61 is engaged within a threaded portion 60 at the opposite end of the cylinder 56, providing an effective turnbuckle arrangement.

The operating lever, generally designated by the numeral 68, has a bifurcated lower end portion consisting of laterally spaced wall sections 66. A radial rivet 64 extends transversely through aligned apertures (unnumbered) formed in the wall sections 66, as well as through a diametric hole (unnumbered) in the head 62 of the screw 61 and a passage (also unnumbered) in the tail part 48 of the handle structure 12. Each of the wall sections 66 is formed with a nose portion 67 on which is defined a camming surface 72, which is disposed to engage the aligned, forwardly adjacent bearing surface 74. The handle portion 70 of the operating lever 68 extends upwardly along the rear of the gripping portion 44, conforming closely thereto and cooperating therewith to define a hand grip for the saw.

As depicted in FIG. 1, the frame is configured to dispose a mounted blade "B" generally parallel to the back member 10, for cutting within relatively open, unrestricted spaces. The swing arm 14 is in its lowered position, and the blade B is supported between pins 26 on the 90° surfaces 22 of the end piece 38 and coupling block 52 (utilizing the holes that are conventionally formed in the ends of the blade). With the operating lever 68 in the closed position illustrated, the camming surfaces 72 on the nose portions 67 of wall sections 66 bear upon the bearing surfaces 74 of the handle structure 12 and thereby apply tension to secure the blade in assembly. It will be appreciated that the elements of the camming surfaces 72 which lie furthest from the axis of pivoting (defined by the radial rivet 64) are brought to locations below the line of force on which the blade B is tensioned (i.e., the longitudinal axis of the channel 50), thereby producing an "over-center" relationship for maintaining the closed position of the operating lever.

Moving the lever 68 to the open position depicted in FIG. 2 will of course relieve the tension on the blade and thereby permit its disengagement. Following removal of the blade the saw can of course be readily reconfigured to the form depicted in FIG. 3. That is effected simply by rotating the swing arm 14 (in the direction of the arrow in FIG. 1) to its inoperative position disposed within the channel 18 of the back member 10. With the arm 14 out of the way the forward end of the blade is engaged upon the pin 26 which projects from that surface of the lobe 20 which is oriented correspondingly to the selected surface of the coupling block 52, and the blade is secured by returning the operating lever 68 to its closed position.

The amount of tension generated by the operating lever is of course readily adjusted by rotation of the knurled connecting cylinder 56 of the turnbuckle arrangement, thereby varying the depth to which the screw 61 is drawn. Needless to say, any such adjustment will generally be made with the operating lever 68 in its open (tension-relieved) position, and manual access to the cylinder 56 is readily afforded by the transverse passage 46 in the handle structure.

It should be noted all three of the 90° surfaces 22 (i.e., on the lobe 20, the end piece 38, and the coupling block 52) lie in a common plane disposed to one side of the medial plane of the saw frame, and that all three of the 45° surfaces 24 lie in a second common plane, disposed to the opposite side of the medial plane of the frame and at a angle thereto. Also, as is indicated by the radial, phantom-line arrow "R" in FIG. 1, the coplanar pins 26 extending from either the surfaces 22 or the surfaces 24 of the lobe 20 and the end piece 34 lie on a common arc, the center point of which is the pin 26 on the corresponding coplanar surface (22 or 24) of the coupling block 52. That arrangement ensures facile conversion between the two configurations of the saw, eliminating any need for gross change features and minimizing (or avoiding) any need adjustment by way of the turnbuckle arrangement.

Although details of construction will be self-evident to those skilled in the art, it might be emphasized that the main components of the assembly (i.e., the back member, the handle structure, and the swing arm) will preferably be fabricated as aluminum die castings, with the back member and handle structure most desirably being integrally formed, as a single piece. The swing arm will advantageously comprise a hollow structure formed with reinforcing web elements as appropriate, so as to afford optimal strength and size without undue weight; i.e., it may take the form of the modified I-beam or channel beam illustrated. It will in any event desirably be at least about one-half inch wide to accommodate both the 90° and also the 45° (or other angularly oriented) mounting structures. Steel elements will typically be employed at wear points, such as for the blade-engaging pins, the coupling block, the end piece for the swing arm, etc. The pins themselves will normally be configured to minimize the likelihood of inadvertent disengagement of the mounted blade; for example, headed or flanged studs may be employed in place of the inwardly tapered conical pins 26 illustrated.

Modifications within the scope of the appended claims will also be evident to those skilled in the art, based upon the present description, and it will be appreciated that the concepts disclosed are equally applicable to styles of saws other than hacksaws, such as bow saws, pruning saws, etc. Whatever the nature of a particular saw, it will usually have traditional overall dimensions.

Thus, it can be seen that the present invention provides a saw frame assembly that enables ready tensioning and release of the mounted blade, coupled with facile conversion between either of two configurations, one of which configurations is diminished from the other to enable cutting within relatively tight, confined spaces. The frame assembly enables the saw blade to be mounted in planes that are both parallel to a medial plane and also angled relative thereto; it is of strong, durable construction, is practical and economical to manufacture, and is comfortable and convenient to use and to operate for quick and easy conversion.

Having thus described the invention, what is claimed is:

1. A saw frame assembly comprising: a generally planar frame including a back member having forward and rearward end portions; handle structure adjacent said rearward end portion of said back member and extending downwardly therefrom; a single, elongate arm member; and means for substantially nonremovably mounting said arm member on said forward end portion of said back member for pivotal movement between a first position, extending downwardly from said back member in confronting, coplanar, spaced relationship to said handle structure, and a second position extending generally along said back member, said arm member having a distal end portion, remote from said back member in said first position of said arm member, with a first pair of substantially transversely aligned blade-engaging elements on opposite sides thereof, taken with reference to a medial plane of said frame, and said forward end portion of said back member having a second pair of said transversely aligned blade-engaging elements on the opposite sides thereof; and a quick-release blade-tensioning mechanism mounted on said frame and including a movable member having a third pair of said blade-engaging elements transversely aligned on opposite sides thereof and being constructed to effect displacement of said movable member between blade-tensioning and blade-releasing positions, each of said blade-engaging elements being constructed to engage one end of a removably mounted saw blade, one element of each of said pairs of blade-engaging elements lying substantially in a first lateral plane, disposed to one side of said medial plane, and being constructed to orient a mounted blade substantially parallel to said medial plane, and the other element of each of said pairs of elements lying in a second lateral plane, disposed to the opposite side of said medial plane, and being constructed to orient the mounted blade at a substantial angle to said medial plane, coplanar elements of said first and second pairs of blade-engaging elements in each of said first and second lateral planes being commonly disposed on an arc circumscribing the coplanar element of said third pair of blade-engaging elements; whereby said frame assembly can mount a saw blade, in either of two orientations, between said second and third pairs of blade-engaging elements for cutting within a relatively confined space, and can readily be converted to mount the blade between said first and third blade-engaging elements, with said arm member in said first position thereof, for cutting within a relatively unconfined space.

2. The assembly of claim 1 wherein said arm member and said forward end portion of said back member have abutment elements which cooperatively define a limit of said first position of said arm member, and wherein said arm member is substantially rectilinear.

3. The assembly of claim 1 wherein said forward end portion of said back member defines an upwardly opening channel in which said arm member is disposed in said second position thereof.

4. The assembly of claim 1 wherein each of said blade-engaging elements comprises a conical pin tapered toward and projecting from an orienting, blade-supporting surface.

5. The assembly of claim 1 wherein said handle structure of said frame has a cam bearing surface thereon, and wherein said blade-tensioning mechanism comprises an operating member and a turnbuckle arrangement, said operating member having a cam element thereon disposed to engage said cam bearing surface and to cooperate therewith to effect such displacement of said movable member, said turnbuckle arrangement including a tension-adjusting link element that is readily accessible for manual adjustment.

6. The assembly of claim 5 wherein said handle structure has a channel extending inwardly from a forward surface thereof to proximate said cam bearing surface, wherein said movable member is a block slidably received in a forward section of said handle structure channel, and wherein said turnbuckle arrangement is received within a rearward section of said channel, said handle structure having an opening therein communicating with said channel thereof and providing such access to said link element.

7. The assembly of claim 1 wherein said handle structure comprises a gripping component having a rearward surface portion, and wherein said blade-tensioning mechanism includes an operating lever pivotably mounted at a location spaced from said back member and comprising an arm portion that extends upwardly along and against said rearward surface portion of said gripping component in said blade-tensioning position of said mechanism, said arm portion being configured to cooperate with said gripping component to provide a hand grip for said saw assembly.

8. A saw frame assembly comprising: a generally planar frame including a back member having forward and rearward end portions; handle structure adjacent said rearward end portion of said back member and extending downwardly therefrom; a single, elongate arm member; and means for substantially nonremovably mounting said arm member on said forward end portion of said back member for movement between a first position, extending downwardly from said back member in confronting, coplanar, spaced relationship to said handle structure, and a second position extending generally along said back member, said arm member having a distal end portion, remote from said back member in said first position of said arm member, with a first pair of substantially transversely aligned blade-engaging elements on opposite sides thereof, taken with reference to a medial plane of said frame, and said forward end portion of said back member having a second pair of said transversely aligned blade-engaging elements on the opposite sides thereof; and a quick-release blade-tensioning mechanism mounted on said frame and including a movable member having a third pair of said blade-engaging elements transversely aligned on opposite sides thereof and being constructed to effect displacement of said movable member between blade-tensioning and blade-releasing positions, said handle structure of said frame having a cam bearing surface thereon, and said blade-tensioning mechanism comprising an operating member and a turnbuckle arrangement, said operating member having a cam element thereon disposed to engage said cam bearing surface and to cooperate therewith to effect such displacement of said movable member, said turnbuckle arrangement including a tension-adjusting link element that is readily accessible for manual adjustment; each of said blade-engaging elements being constructed to engage one end of a removably mounted saw blade, one element of each of said pairs of blade-engaging elements lying substantially in a first lateral plane, disposed to one side of said medial plane, and being constructed to orient a mounted blade substantially parallel to said medial plane, and the other element of each of said pairs of elements lying in a second lateral plane, disposed to the opposite side of said medial plane, and being constructed to orient the mounted blade at a substantial angle to said medial plane, coplanar elements of said first and second pairs of blade-engaging elements being commonly disposed on an arc circumscribing the coplanar element of said third pair of blade-engaging elements; whereby said frame assembly can mount a saw blade, in either of two orientations, between said second and third pairs of blade-engaging elements for cutting within a relatively confined space, and can readily be converted to mount the blade between said first and third blade-engaging elements, with said arm member in said first position thereof, for cutting within a relatively unconfined space.

9. The assembly of claim 8 wherein said handle structure has a channel extending inwardly from a forward surface thereof to proximate said cam bearing surface, and wherein said movable member is a block slidably received in a forward section of said handle structure channel and said turnbuckle arrangement is received within a rearward section thereof, said handle structure having a lateral opening therein communicating with said channel thereof and providing such access to said link element.

10. A saw frame assembly comprising: a generally planar frame including a back member having forward and rearward end portions; handle structure adjacent said rearward end portion of said back member and extending downwardly therefrom; a single, elongate arm member; and means for substantially nonremovably mounting said arm member on said forward end portion of said back member for pivotal movement between a first position, extending downwardly from said back member in confronting, coplanar, spaced relationship to said handle structure, and a second position extending generally along said back member, said arm member having a distal end portion, remote from said back member in said first position of said arm member, with a first pair of substantially transversely aligned blade-engaging elements on opposite sides thereof, taken with reference to a medial plane of said frame, and said forward end portion of said back member having a second pair of said transversely aligned blade-engaging elements on the opposite sides thereof; and a quick-release blade-tensioning mechanism mounted on said frame and including a movable member having a third pair of said transversely aligned blade-engaging elements on opposite sides thereof and being constructed to effect displacement of said movable member between blade-tensioning and blade-releasing positions, said handle structure of said frame having a cam bearing surface thereon, and said blade-tensioning mechanism comprising an operating member and a turnbuckle arrangement, said operating member having a cam element thereon disposed to engage said cam bearing surface and to cooperate therewith to effect such displacement of said movable member, said turnbuckle arrangement including a tension-adjusting link element that is readily accessible for manual adjustment; said handle structure comprising a gripping component having a rearward surface portion, and said blade-tensioning mechanism including an operating lever pivotably mounted at a location spaced from said back member and comprising an arm portion that extends upwardly along and against said rearward surface portion of said gripping component in said blade-tensioning position of said mechanism, said arm portion being configured to cooperate with said gripping component to provide a hand grip for said saw assembly; each of said blade-engaging elements being constructed to engage one end of a removably mounted saw blade, one element of each of said pairs of blade-engaging elements lying substantially in a first lateral plane, disposed to one side of said medial plane, and being constructed to orient a mounted blade substantially parallel to said medial plane, and the other element of each of said pairs of elements lying in a second lateral plane, disposed to the opposite side of said medial plane, and being constructed to orient the mounted blade at a substantial angle to said medial plane, coplanar elements of said first and second pairs of blade-engaging elements in each of said first and second lateral planes being commonly disposed on an arc circumscribing the coplanar element of said third pair of blade-engaging elements; whereby said frame assembly can mount a saw blade, in either of two orientations, between said second and third pairs of blade-engaging elements for cutting within a relatively confined space, and can readily be converted to mount the blade between said first and third blade-engaging elements, with said arm member in said first position thereof, for cutting within a relatively unconfined space.

11. A saw frame assembly comprising: a generally planar frame including a back member having forward and rearward end portions; handle structure adjacent said rearward end portion of said back member and extending downwardly therefrom; a single, elongate arm member; and means for substantially nonremovably mounting said arm member on said forward end portion of said back member for movement between a first position, extending downwardly from said back member in confronting, coplanar, spaced relationship to said handle structure, and a second position extending generally along said back member, said arm member having a distal end portion, remote from said back member in said first position of said arm member, with a first pair of substantially transversely aligned blade-engaging elements on opposite sides thereof, taken with reference to a medial plane of said frame, and said forward end portion of said back member having a second pair of said transversely aligned blade-engaging elements on the opposite sides thereof; and a quick-release blade-tensioning mechanism mounted on said frame and including a movable member having a third pair of said transversely aligned blade-engaging elements transversely aligned on opposite sides thereof and being constructed to effect displacement of said movable member between blade-tensioning and blade-releasing positions, said handle structure comprising a gripping component having a rearward surface portion, and said blade-tensioning mechanism including an operating lever pivotably mounted at a location spaced from said back member and comprising an arm portion that extends upwardly along and against said rearward surface portion of said gripping component in said blade-tensioning position of said mechanism, said arm portion being configured to cooperate with said gripping component to provide a hand grip for said saw assembly; each of said blade-engaging elements being constructed to engage one end of a removably mounted saw blade, one element of each of said pairs of blade-engaging elements lying substantially in a first lateral plane, disposed to one side of said medial plane, and being constructed to orient a mounted blade substantially parallel to said medial plane, and the other element of each of said pairs lying in a second lateral plane, disposed to the opposite side of said medial plane, and being constructed to orient the mounted blade at a substantial angle to said medial plane, coplanar elements of said first and second pairs of blade-engaging elements in each of said first and second lateral planes being commonly disposed on an arc circumscribing the coplanar element of said third pair of blade-engaging elements; whereby said frame assembly can mount a saw blade, in either of two orientations, between said second and third pairs of blade-engaging elements for cutting within a relatively confined space, and can readily be converted to mount the blade between said first and third blade-engaging elements, with said arm member in said first position thereof, for cutting within a relatively unconfined space.

* * * * *